Aug. 4, 1953  B. BARÉNYI  2,647,791
SEATING ARRANGEMENT FOR VEHICLES
Filed Nov. 22, 1949
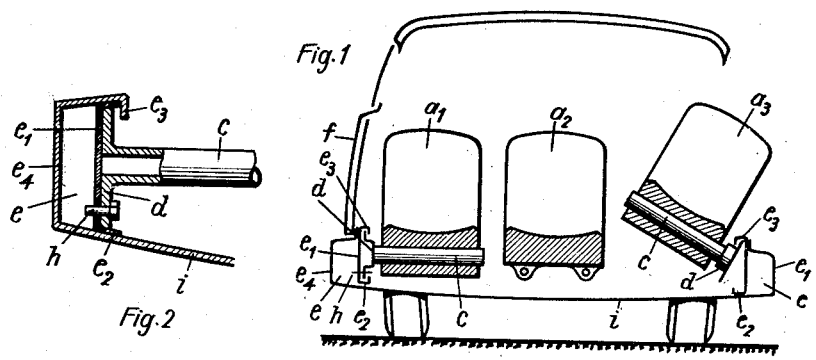
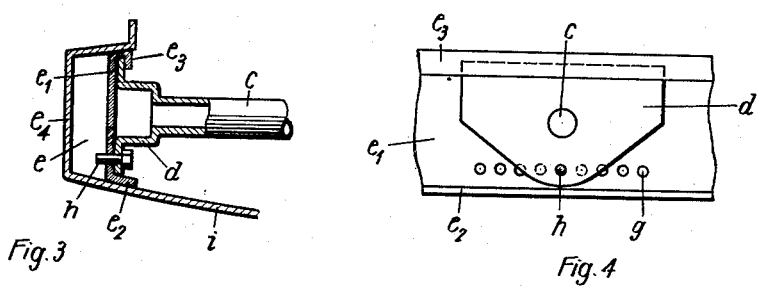
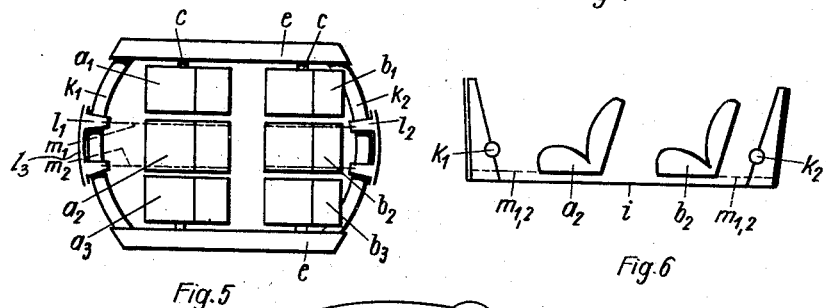
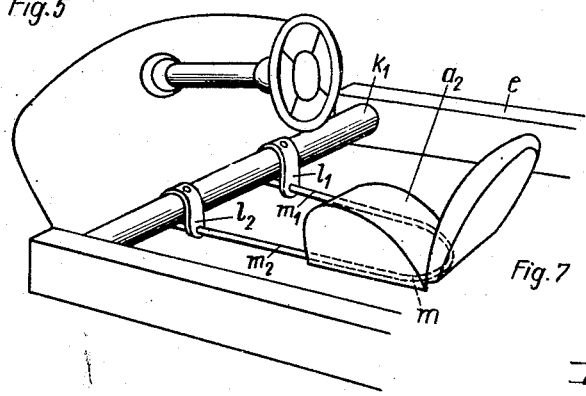
INVENTOR
BELA BARENYI
By:
Hauetine, Lake & Co.
AGENTS Patented Aug. 4, 1953

2,647,791

UNITED STATES PATENT OFFICE 2,647,791

SEATING ARRANGEMENT FOR VEHICLES

Béla Barényi, Stuttgart-Rohr, Germany

Application November 22, 1949, Serial No. 128,802
In Germany November 27, 1948

15 Claims. (Cl. 296—64)

This invention relates to an improved seating arrangement for vehicles, in particular for passenger cars. It is one object of this invention to provide means for an easy assembly, disassembly or exchange of the seats. A further object of the invention is to provide a free floor unrestricted by seats and seat carriers.

Passenger cars as heretofore generally constructed have the drawback that the floor has to support the load of seats and requires openings for securing the seat boxes, moreover that the interior of the car body has owing to the arrangement of the seats and seat boxes many corners which make cleansing a very painstaking job. Foot mats, for instance, can be employed only after having been provided with cut out parts of intricate shape.

Contrary to the aforesaid it is an outstanding feature of this invention that the seats are mounted on seat carriers projecting inwards from the walls surrounding the interior of the car or from the frame members e. g. (side and cross members), in particular in such a manner that a continuous floor is provided which is neither interrupted by the seats or seat supports nor loaded by them.

Farther it is convenient that the floor be neither interrupted by frame members or driving elements of the vehicle nor by any protruding parts for the same. The seats and their carriers are, moreover, according to a further feature of this invention located above the floor at such a level that a continuous floor covering (i. e. on principle without cut out parts) may be placed. The seats are e. g. for this purpose in particular mounted on unsupported seat carriers which are supported at one end only at or in the walls of the car body (e. g. on frame members surrounding the interior of the car). The invention is further characterized in that the seat carriers which are supported at or in the walls (or frame members) are capable of being adjusted e. g. by a sliding movement. This may be realized by designing the frame side members or the like as guides. The seats or seat carriers may be suspended in these guides and maintained in their position either by their proper weight or by the weight of the persons sitting upon them. According to another embodiment of this invention they may be also put into apertures provided in the walls and frame members respectively or in structures associated therewith.

The arrangement of the seats independently of the floor provides above all the advantage that the floor is not subject to load by the seats and may, therefore, have a lighter construction than hitherto usual. The forces acting upon the seats are, on the contrary, transmitted directly to the frame members, where they become absorbed in a most favourable manner, in particular in the event that the frame should be designed as a system of side and cross members, forming thus a self-contained, rigid unit. The absence of seat boxes or seat carriers and of any protrudings whatever of the floor of the car body has in addition to providing an uninterrupted, continuous floor the further advantage that it is unnecessary to provide apertures in the floor for the seat boxes or seat carriers, thus avoiding the effect of corrosion or similar destructions occurring above all at such apertures or have their starting point at such places. The floor may be designed plane or vaulted (e. g. cylindrically or spherically) or in any other suitable manner, avoiding all angles and corners, for instance by a gentle stepping. Such a floor remains free from corners prone to the accumulation of dirt and may be quickly cleansed in a very thorough manner, in particular if the seats have been mounted in the car body together with the seat carriers so as to permit their easy removal. On the one hand—even with the seats being mounted—it is possible to lay in a continuous integral covering and, on the other hand—with the seats being removed—to use the vehicle at any time for other purposes than for transporting passengers, e. g. as a delivery van or the like.

Furthermore it is particularly convenient to make the seats interchangeable as well as to provide facilities for reverting the seats by an angle of 180°. The seats may be anchored at the side or cross members of the frame and at the side or cross walls of the car body respectively or partially at one and partially at the other of these sides and cross members, and this in particular in the event that three seats each are located contiguously. In this case the middle seats of the aforementioned three ones will be mounted as a rule on the front and rear cross walls respectively of the car body or on a front or rear cross member, whereas the side seats are to be anchored at or in the adjacent side walls (or side members) or likewise at or in the cross walls (or cross members). It will be, furthermore, convenient to have the seats adjustable in various directions.

Further features and advantages of the invention may be gathered from the following description of some embodiments thereof which are diagrammatically shown in the accompanying drawings.

Fig. 1 is a cross section through a vehicle with three contiguous seats,

Figs. 2 and 3 show two further anchoring systems of the seat carriers according to Fig. 1, Fig. 4 is a view of the construction as per Fig. 3, seen from the right, Fig. 5 is a top plan view of the car body according to Fig. 1 in a reduced scale.

Fig. 6 is a sectional side elevation of the car body in Fig. 5.

Fig. 7 is a perspective view of one of the seats fastened to the front cross member.

In the examples of construction illustrated there are two rows of three adjacent seats $a_1$, $a_2$, $a_3$ and $b_1$, $b_2$, $b_3$ respectively. The two outer seats of each row $a_1$, $a_3$ and $b_1$, $b_3$ respectively are sleeved on tubular seat carriers $c$ and secured thereon in a suitable manner against rotation. The seats are conveniently mounted on their carriers such that the carrier is located approximately below the center of gravity of the seat and of the person sitting thereon. The seat carriers $c$ are provided with flanges or anchor plates $d$, which may be shaped as shown in Fig. 4 and anchored to lateral longitudinal sills $e$ of the vehicle frame or of the self-supporting car body below the doors $f$, by supporting themselves against the inner wall $e_1$ of the sill and abutting with their lower edge on a longitudinal flange $e_2$ thereof. The upper edges of the anchor plates $d$ furthermore engage below longitudinal flanges $e_3$ of the sills $e$ and support themselves against the latter by the weight of the seat carrier and of the seats as well as of the person sitting thereon. The seats are thus kept in their position by their proper weight or by the weight of the persons sitting upon them. The wall elements and flanges $e_1$, $e_2$, $e_3$ of the sills form guiding rails in which the seat carriers $c$ may be slid in the longitudinal direction of the vehicle by means of their anchor plates $d$. A pin $h$ engaging into one of the holes $g$ will lock the seat against unintentional displacement.

The removal of the seats from the car body may be effected, as shown in Fig. 1 for the seat $a_3$, by swivelling the seat together with its carrier (after removal of the pin $h$ and, if need be, by slightly lifting the seat) upwards round the upper edge of the anchor plate $d$ within the flange guide $e_3$ in order to withdraw it then from the flange guide. By tilting the seats about the tubular carriers $c$ one may adjust their inclination, or by withdrawing and reversing them one may bring them into a new position which differs by 180° from the former (the person seated looking then backwards). Furthermore the seats may, if desired, be displaced on their carriers transversely to the direction of travel. Preferably, the distance of the upper straight edge of the anchor plate $d$ from the tubular member or tubular arm $c$ is smaller than the distance of the curved lower edge of plate $d$ from the arm $c$, as shown in Fig. 4. Consequently, the arm $c$ may be mounted at a lower level by disengaging the anchor plate $d$ in the manner illustrated in Fig. 1 at the right, by then turning the anchor plate $d$ and the arm $c$ about the axis of the latter through an angle of 180° and by then reinserting the anchor plate with its curved edge at the top and its straight edge at the bottom so that the curved edge will engage behind the flange $e_3$ whereupon the straight edge will rest upon the flange $e_2$. It is convenient in all of these cases to secure the seat and the seat carrier respectively in the adjusted position by suitable locking devices.

Figs. 1, 2 and 3 show various possibilities of shaping the frame side member $e$. Whilst in the case of Figs. 1 and 3 the flange $e_3$ is formed by the inner wall $e_1$ of the side member, it constitutes in the case of Fig. 2 part of the outer wall $e_4$ of the same, which at the same time may be formed integral with the floor I.

As appears more particularly in Figs. 5, 6 and 7, the middle seats $a_2$ and $b_2$ are supported by the tubular cross members $k_1$ and $k_2$ of the frame located adjacent to the front and rear walls of the car body. The cross members which may be curved as shown in Fig. 5 or straight as shown in Fig. 7 are provided to this end with reinforcing members or fastening devices $l_1$, $l_2$ into which two carriers $m_1$, $m_2$ are inserted upon which the seats are resting and may be displaced in longitudinal direction and locked in their position.

As shown in Fig. 7 these carriers $m_1$, $m_2$ which are attached to the cross member $k_1$ by means of the clip-shaped fastening elements $l_1$, $l_2$ are preferably formed by the arms of a U-shaped rod $m$ of a slightly resilient material. The forward downwardly depending arms of the clips $l_1$ and $l_2$ are connected by a horizontal integral plate $l_3$ positioned on the front face of the cross member $k_1$ as shown in Fig. 5. In Fig. 7 this plate $l_3$ is hidden from view by the cross member $k_1$. The front ends of the arms $m_1$ and $m_2$ project through holes provided in the downwardly depending arms of the clips $l_1$ and $l_2$ and may be readily withdrawn therefrom. The clips $l_1$ and $l_2$ are secured against turning on the cross member $k_1$ by any suitable means, such as rivets, the heads of which are visible in Fig. 7 on top of the clips. The leg room for the seat is in all of these cases between the two carriers $m_1$, $m_2$. Also in this case the seats may be quickly removed from the car body by withdrawing the seat carriers $m_1$, $m_2$ from the clips $l_1$ and $l_2$.

As may be seen from the drawings, the whole floor of the interior of the car is clear of seat boxes as well as of other disturbing upwardly protruding elements and frame members which particularly applies to front wheel drives or rear engine cars. Thus, an uninterrupted, plain and quickly to be cleansed floor $i$ may be provided, which in the case of the example of construction is slightly vaulted along a cylindrical surface.

What I claim is:

1. In a motor vehicle, the combination comprising a lateral longitudinal horizontal sill forming part of the body, a floor panel rigid with and extending from said sill, an arm, means for attaching said arm to said sill in substantially horizontal position spaced from said floor panel, and a seat mounted on said arm.

2. In a motor car, the combination comprising a frame including two longitudinal lateral horizontal sills forming part of the body of the car, a floor panel rigid with and extending between said sills, cantilever arms, means for attaching said arms to the opposed sides of said sills in horizontal position spaced from said floor panel, and seats mounted on said arms.

3. In a motor car, the combination comprising a body frame composed of two hollow lateral horizontal sills having a distance exceeding the tread width and of two hollow transverse girders connecting the ends of said sills, a floor panel rigid with and extending between said sills, arms attached to said sills and extending horizontally into the space between said sills and said girders spaced from said floor panel, and seats on said arms.

4. In a motor car, the combination comprising a frame including two longitudinal lateral horizontal sills forming part of the body of the car, a floor panel rigid with and extending between said sills, arms, means for detachably but rigidly fastening said arms to said sills in horizontal position spaced from said floor panel, and seats mounted on said arms.

5. In a vehicle, the combination comprising a longitudinal lateral sill, a floor panel rigid therewith, means forming a longitudinal guide on said sill, an anchor plate slidable in said guide, a horizontal arm rigidly connected with said anchor plate and extending horizontally above and spaced from said floor panel, a seat on said arm, and means for releasably securing said anchor plate in a selected position within said guide.

6. In a motor vehicle, the combination comprising a lateral longitudinal sill forming part of a body frame, a floor panel extending from and rigid with said sill, an arm, means for securing said arm to said sill in a position above and spaced from said floor panel, and a seat supported by said arm, said means for securing said arm to said sill comprising interlocking means on said arm and said sill, said interlocking means including conjugate abutting faces limiting a downward rocking motion without preventing an upward rocking motion of said arm, said interlocking means being adapted to be disengaged by an upward rocking motion of said arm.

7. The combination claimed in claim 5 in which said guide comprises a channel bar having an upright web affording a seat for said anchor plate having a lower flange on which said anchor plate may rest and having an upper flange bent downwardly and adapted to engage over said anchor plate.

8. The combination set forth in claim 5 in which said arm is formed by a tube.

9. In a motor vehicle, the combination comprising a lateral longitudinal horizontal sill forming part of the body, a floor panel rigid with and extending from said sill, a tubular arm, means for rigidly attaching said arm to said sill in substantially horizontal position spaced from said floor panel, and a seat having an opening adapted to be slipped on said arm and adapted to be slid off same.

10. The combination claimed in claim 9 in which said seat has a horizontal hole open at either side and adapted to be engaged over said arm.

11. The combination claimed in claim 2 in which said seats are shaped to be interchangeable.

12. In a motor vehicle, the combination comprising a body equipped with at least one lateral door, with a lateral longitudinal horizontal sill extending beneath said door, and with a floor panel rigid with said sill, an arm attached to said side sill in registry with said door and extending horizontally above and spaced from said floor panel, and a seat supported by said arm.

13. In a motor vehicle, the combination comprising a body frame composed of lateral side sills and of transverse girders connecting same, a floor panel extending between and rigid with said side sills, a substantially U-shaped member, means for attaching the arms of said member to one of said transverse girders in a position extending substantially horizontally above and spaced from said floor panel, and a seat attached to said member spaced from said girder to provide leg space therebetween.

14. In a motor vehicle, the combination comprising a body frame composed of lateral longitudinal sills, of transverse girders connecting the ends of said sills and of a floor panel rigid with and extending between said sills, arms attached to said side sills and extending above and spaced from said floor panel, lateral seats attached to said arms, the arm attached to one of said sills being spaced from the arm attached to the other one of said sills, a central seat therebetween, and means attached to one of the transverse girders and extending above and spaced from said floor panel and constituting a support for said central seat.

15. In a motor vehicle, the combination comprising a floor panel of sheet metal having an upwardly and inwardly bent marginal zone constituting a longitudinal channel beam, a flanged sheet metal plate inserted in and closing said channel beam to constitute a box-shaped lateral sill, an arm, means for attaching said arm to said sill in substantially horizontal position spaced from said floor panel, and a seat mounted on said arm.

BÉLA BARÉNYI.

References Cited in the file of this patent

UNITED STATES PATENTS

| Number | Name | Date |
|---|---|---|
| 552,682 | Bixby | Jan. 7, 1896 |
| 1,034,464 | Kennedy | Aug. 6, 1912 |
| 1,207,040 | Hill | Dec. 5, 1916 |
| 1,240,192 | French | Sept. 18, 1917 |
| 1,250,155 | Emond | Dec. 18, 1917 |
| 1,610,065 | Meyer | Dec. 7, 1926 |
| 2,177,896 | Lee | Oct. 31, 1939 |

FOREIGN PATENTS

| Number | Country | Date |
|---|---|---|
| 476,100 | Great Britain | Dec. 1, 1937 |
| 883,110 | France | Mar. 15, 1943 |